Patented Nov. 5, 1946

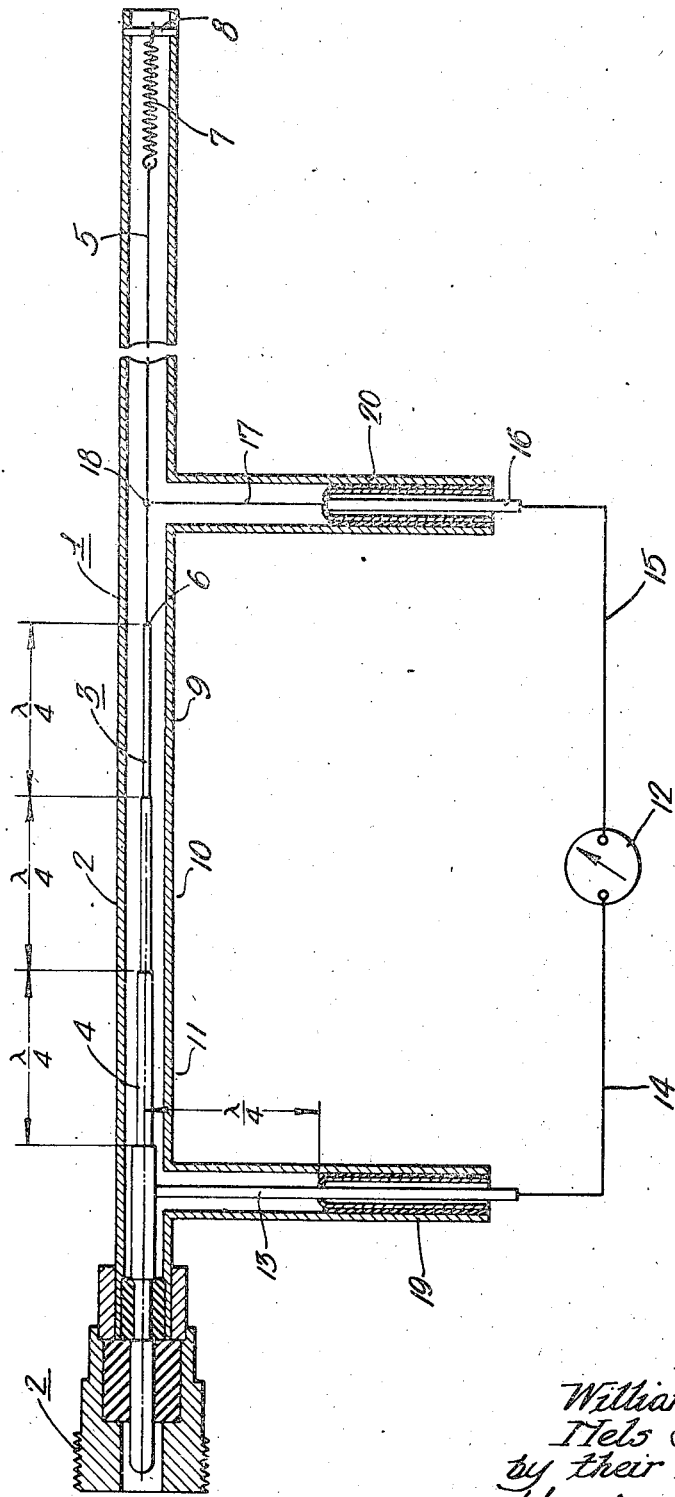

2,410,706

UNITED STATES PATENT OFFICE 2,410,706

DEVICE FOR MEASURING HIGH-FREQUENCY POWER

William E. Bradley, Swarthmore, and Nels Johnson, Penn Wynne, Pa., assignors, by mesne assignments, to Philco Corporation, Philadelphia, Pa., a corporation of Pennsylvania Application April 28, 1944, Serial No. 533,226

4 Claims. (Cl. 171—95)

This invention relates to devices for measuring high frequency power and has to do more especially with power measurements at ultra high frequencies.

One of the primary objects of this invention is to provide a simple, compact, and preferably highly portable ultra high frequency power measuring instrument.

Another object is to provide an ultra high frequency power measuring instrument which requires no special operational skill but which nevertheless will afford accurate readings.

A further object is to provide a device of the above-stated character which can easily be calibrated against D. C. or low frequency A. C. and which will retain its accuracy.

Still another object is to provide an ultra high frequency power measuring instrument which will afford accurate power readings within a very small percentage of error throughout a fairly wide frequency band without the necessity of tuning or the making of any adjustment to compensate for frequency differences.

Another object is to provide an instrument of the above-stated character which can utilize a commercial moving coil meter, such as a microammeter, instead of requiring a meter of special construction.

The drawing depicts a preferred embodiment of the invention and will be referred to in the detailed description hereinafter.

A common method of measuring power at ordinary radio frequencies involves dissipation of the power in a resistance load and utilizing the temperature rise as an indicator of the power dissipated. This can be done by noting thermometer readings and relating the readings to corresponding known power values, or it can be done by utilizing the temperature rise to actuate a thermo-electric generator connected to a microammeter or the like, but the simple prior art devices of the above-mentioned character which will produce accurate results at moderate frequencies, such as broadcast frequencies, or even higher, are not workable at ultra high frequencies where uncertain parameters such as stray capacities and inductances become factors of major importance.

In carrying out the present invention the ultra high frequency power to be measured is similarly dissipated in a resistance load; but by taking advantage of the favorable characteristics which are inherent to co-axial lines, stray capacities and inductances and their erratic effects are avoided. Hence it becomes possible with an instrument of simple construction to obtain accurate power measurements at all frequencies which co-axial lines are adapted to transmit.

In the device illustrated a co-axial line 1 comprises an outer tubular conductor 2 and an axial conductor 3—which axial conductor can best be considered as consisting of two serially-connected major parts 4 and 5 joined end-to-end at the junction 6. The latter is a hot thermocouple junction which generates D. C. voltage, the magnitude of which serves to indicate the amount of power being dissipated by the device.

The input end of the co-axial line is at the extreme left and is provided with a standard coupling 2 by means of which the co-axial line can be connected to a source of ultra high frequency power—generally through a co-axial feed line, not shown, having a characteristic impedance which the power measuring device has been designed to match.

That portion of axial conductor 3 which lies to the right of junction 6 and is identified by numeral 5 consists of a small diameter wire of some convenient length such as thirty inches, more or less, and having a rather high resistance. Wire 5 is preferably of constantan because that is considered the best material obtainable for combining with copper to form the thermo-electric junction 6. The right hand end of wire 5 is connected to one end of a coil spring 7 which in turn is anchored to a pin 8 which passes laterally through the walls of outer conductor 2. Spring 7 is under tension and holds wire 5 taut.

The portion of the co-axial line to the right of junction 6 has a definite characteristic impedance which can be calculated or measured and which must be matched to the feed line or source of ultra high frequency power. For that purpose it is necessary to interpose between the input end and junction 6 one or more matching transformers. In the device here shown there are three such transformers 9, 10, and 11 in series. Each of these consists of a quarter-wave section and their several characteristic impedances are so chosen as to afford a uniform transition from the feed line impedance to that of the line section to the right of junction 6. At the same time each matching transformer is designed to effect a proper match between the line sections which it interconnects.

The larger the number of matching transformers employed the wider will be the band of frequencies over which ultra high frequency power can be measured directly within a prescribed limit of error, or the smaller will be the error for a given frequency band.

An object to be kept in mind is that we wish to dissipate as much as possible of the power to be measured immediately adjacent junction 6 so as to raise the temperature of that junction both quickly and adequately. Especially is this true where the magnitude of the power to be measured is small. Another factor to be considered is that it is essential to accuracy that wave reflection be reduced to an insignificant magnitude. That is to say, it is essential that nearly all of the propagated wave energy be dissipated by the time it reaches the right hand end of the coaxial line, so that there will be little or no reflection back from that end toward junction 6. The underlying reason for this is that reflection causes standing waves which detract from the accuracy of the device by causing current nodes and antinodes to shift their positions along wire 5 as the frequency changes. Of course, reflection could be entirely prevented in the usual manner through employment of a terminating resistance equal to the characteristic impedance of the line; but that would tend to defeat our purpose by subtracting from the energy dissipation at and adjacent junction 6. By making the resistance of wire 5 quite high, the line is made to simulate closely a line of infinite length, and wave reflection then becomes negligible. By way of example, it may be stated that in one case a constantan wire of 1 mil diameter having a resistance of about 900 ohms was found entirely satisfactory.

If wire 5 is of very small gauge its unit resistance will obviously be proportionately high; and the desired overall resistance can then be realized with a wire of relatively little length. This means that the overall length of the device can be kept within convenient limits by using fine wire or wire having a higher specific resistance. But if the voltages to be dealt with are large it may be found impracticable to use extremely fine wire because of corona effect.

The small D. C. potential generated by the thermocouple hot junction 6 is impressed upon a microammeter 12 through a circuit which includes the center conductors of matching transformers 9, 10, and 11 together with conductors 13, 14, 15, 16, 17, and a small portion of wire 5 lying between point 18 and junction 6. The two legs of the D. C. circuit are brought out to meter 12 through a pair of quarter-wave filters 19 and 20 which serve to prevent flow of radio frequency current through the external portion of the D. C. circuit which includes meter 12.

Calibration of meter 12 with respect to the ultra high frequency power to be measured can conveniently be accomplished by impressing a series of D. C. or low frequency voltages upon the input terminals of the device and plotting measured values of $I^2$ against meter scale readings. Then, for any corresponding meter scale reading taken with U. H. F. power within the frequency band which the device is designed to cover, $$W_{rf} = I^2 Z_0 \frac{R_{rf}}{R_0}$$

Where $W_{rf}$ = U. H. F. power in watts.

$I^2$ = current square value corresponding to meter scale readings as previously determined with D. C. or low frequency power.

$Z_0$ = characteristic impedance of line to right of junction 6.

$R_{rf}$ = unit resistance of wire 5 at ultra high frequency.

$R_0$ = unit resistance of wire 5 at D. C. or low frequency.

As the ultra high frequency current flowing in wire 5 is comparatively high at the left hand end adjacent junction 6 and drops off rapidly toward the right, it might seem that thermal conduction away from junction 6 would be aggravated by the temperature gradient along wire 5 and, for that reason, that the temperature of junction 6 due to a give current would be substantially different at ultra high frequency than at D. C. or low frequency. But such is not the case. It appears that differences of thermal conduction along wire 5 as between low and high frequencies do not exercise any detectable influence on the temperature of the junction. Therefore, it is not necessary to take thermal conduction into account in the computation of power values from scale readings.

We claim:

1. In a high frequency power measuring device, a co-axial line having an input end and comprising a tubular outer conductor and an axial conductor, said axial conductor consisting of two parts serially connected and comprising different materials which form, conjointly, a thermo-couple hot junction, the one of said parts most remote from said input end including resistance of such magnitude that high frequency wave energy propagated through said coaxial line from said input end is reduced to a small fraction of its starting value by the time it reaches the other end of the line, and a direct current circuit including said thermo-couple junction, together with a meter responsive to voltage generated by the thermo-couple junction for indicating the power consumed by said co-axial line.

2. In a high frequency power measuring device, a co-axial line having an input end and comprising a tubular outer conductor and an elongate axial conductor having such high resistance that a high frequency wave propagated along said line from said input end is attenuated to a small fraction of its amplitude at the input end by the time it reaches the other end of the line, a thermo-couple junction disposed adjacent said axial conductor at a point near its input end where the heat generated by high frequency current traversing said axial conductor is of maximum value, and a circuit including said thermo-couple junction together with a meter responsive to voltage generated by said thermo-couple junction for indicating the high frequency power consumed by said co-axial line.

3. In a high frequency power measuring device, a co-axial line having an input end and comprising a tubular outer conductor and an axial conductor, said axial conductor consisting of a first portion comprising one or more quarter-wave matching sections of good conductivity situated at said input end, and an elongate wire of high resistance material connected at one end to the terminus of said first portion remote from said input end and extending from said terminus toward the end of the line remote from said input end, said elongate wire being composed of material which will form, conjointly with said first portion and at said terminus, a good thermo-couple junction, the overall resistance of said wire being so high that a high frequency wave propagated through said line from said input end is reduced to a small fraction of its input amplitude by the time it reaches the other end of the line, and a direct current circuit including said thermo-couple junction together with a meter responsive to voltage generated by said thermo-couple junction for indicating the power consumed by said co-axial line.

4. In a high frequency power measuring device, a co-axial line having an input end and comprising a tubular outer conductor and an axial conductor, said axial conductor consisting of a first portion adjacent said input end and comprising one or more quarter-wave matching sections of good conductivity, and an elongate high resistance wire connected at one end to the terminus of said first portion remote from said input end, said wire having its other end connected to a tension spring at the end of said line remote from said input end, said wire being tensioned by said spring, said wire forming at said terminus, conjointly with said first portion, a thermo-couple junction, the resistance of said wire being so high that wave reflection in said line is reduced to an insignificant magnitude, and a circuit including said thermo-couple junction together with a meter responsive to voltage generated by said thermo-couple junction for indicating the high frequency power consumed by said co-axial line.

WILLIAM E. BRADLEY.
NELS JOHNSON.